(12) United States Patent
Fishlock et al.

(10) Patent No.: US 6,550,147 B1
(45) Date of Patent: Apr. 22, 2003

(54) SAW ATTACHMENT

(76) Inventors: Dwight D. Fishlock, 2 Fieldstone Way, Hopedale, MA (US) 01747; Glenn R. Peloquin, 32 Pearl St., Bellingham, MA (US) 02019

( * ) Notice: Subject to any disclaimer, the term of this patent is extended or adjusted under 35 U.S.C. 154(b) by 0 days.

(21) Appl. No.: 09/966,708

(22) Filed: Sep. 28, 2001

(51) Int. Cl.[7] ............................................. B27B 19/00
(52) U.S. Cl. ........................... 30/375; 30/371; 30/374; 30/392
(58) Field of Search .................... 30/371, 392, 393, 30/394, 375, 377, 376, 374

(56) References Cited

U.S. PATENT DOCUMENTS

| | | | |
|---|---|---|---|
| 2,906,304 A | * 9/1959 | Levine | 30/375 |
| 2,954,808 A | * 10/1960 | Sweeney et al. | 30/375 |
| 3,028,890 A | * 4/1962 | Atkinson et al. | 30/375 |
| 3,260,290 A | * 7/1966 | Happe et al. | 30/375 |
| 3,360,021 A | * 12/1967 | Mejia | 30/375 |
| 3,412,767 A | * 11/1968 | Green, Jr. | 30/392 |
| 3,547,166 A | * 12/1970 | Dudek | 30/392 |
| 4,553,306 A | * 11/1985 | Mineck | 30/392 |
| 4,984,369 A | * 1/1991 | Flint et al. | 30/375 |
| 5,421,091 A | * 6/1995 | Gerritsen, Jr. | 30/377 |
| 5,535,520 A | * 7/1996 | Armstrong | 30/375 |
| 5,724,741 A | * 3/1998 | Bednar | 30/376 |

* cited by examiner

Primary Examiner—Hwei-Siu Payer
(74) Attorney, Agent, or Firm—David J. Cole

(57) ABSTRACT

An attachment for a reciprocating saw comprises an offset member mounted on the drive head of the saw and comprising a lateral extension which holds a saw blade clear of the saw body The attachment also comprises a guard member having a planar surface adapted to engage a wall, and a slot through which the saw blade extends. The guard member is pivotally mounted on the saw body at a point spaced from the drive head. The attachment facilitates making a saw cut in a surface adjacent an inside corner.

12 Claims, 4 Drawing Sheets

SAW ATTACHMENT

FIELD OF THE INVENTION

This invention relates an attachment for a saw. More specifically, this invention relates to an attachment for a reciprocating saw which enables the saw to be used more conveniently and safely to make cuts adjacent an interior corner of a room, or in similar situations there two planar surfaces meet forming an interior angle.

BACKGROUND OF THE INVENTION AND PRIOR ART

Workers engaged in the building and allied trades often make use of powered reciprocating saws, such as those sold under the Registered Trade Mark "SAWZALL". Such reciprocating saws typically comprise a substantially cylindrical body having a diameter of about 10–15 cm. (about 4–6 inches) such that it can comfortably be supported on one hand. The body typically contains an electric motor (a pneumatic or other motor may also be used) which is arranged to reciprocate a drive head axially of the cylindrical body, this drive head being substantially centrally located on one end surface of the cylindrical body. The drive head is provided with blade attachment means so that a saw blade can be mounted on the drive head to reciprocate therewith. In some cases, to minimize the risk of damage to a wall or other surface being cut, and to increase operator safety, a guard is pivotally mounted on the cylindrical body at a point adjacent the drive head. Also to increase operator safety, a substantially frusto-cylindrical flexible skirt is mounted on the body surrounding the drive head, this skirt tapering outwardly as it extends from the drive head. The end of the body remote from the drive head is usually provided with a handle and with a power switch.

Although modem reciprocating saws are very useful and enable a worker to form saw cuts much more quickly than is possible with a hand saw, they do suffer from the problem that, because of the size of the housing, they cannot be used in their normal position (i.e., with the axis of the cylindrical housing lying in a plane perpendicular to the wall or other surface being cut, this plane containing the saw cut) when it is necessary to make a cut close to an interior corner, for example two walls meeting at right angles, or between a wall and a floor. To make such cuts, construction workers often bend the blades of such saw, so that the part of the blade making the cut still lies substantially perpendicular to the wall, while the cylindrical body lies at an acute angle to the wall, inclined away from the interior corner. Such bending of the saw blade renders it difficult to form a neat saw cut, since the blade will inherently attempt to straighten itself, thus forming a non-linear cut. More seriously, the bent blade some times fractures, resulting in damage to one or both surfaces forming the corner, and the risk of serious injury to the operator.

Attempts have been made to overcome the need to bend saw blades when cutting adjacent a corner. For example, U.S. Pat. No. 2,954,808 (Sweeney et al.) describes an offset attachment for a reciprocating saw. This attachment comprises a substantially Z-shaped member having a first section which engages the drive head, a second section which extends substantially normal to the first section and laterally of the axis of the body, so that the outer end of the second section is clear of the saw body, and a third section which extends from the outer end of the second section parallel to the first section and carries a saw blade. An extended support is rigidly mounted on both sides of the saw body and extends forwardly, being provided with a first surface which lies adjacent and parallel to the saw blade, and a second surface which can abut the wall or other surface being cut. However, this apparatus has serious disadvantages. One side of the saw blade is exposed along its entire length, and this exposed blade is potentially dangerous to an operator. Furthermore, since the support only contacts the wall on one side of the blade, the blade may tend to tilt away from the support. Finally, since the extended support is rigidly mounted on the saw body, when the saw is tilted at an angle to the surface being cut (as when starting a saw cut) only one edge of the second surface will contact the surface, which may result in damage to the surface.

Thus, there is a continuing need for an attachment which will all use of a reciprocating saw to make cuts adjacent and interior corner in a manner which promotes operator safety and minimizes the risk of damage to the walls or other surfaces forming the corner, and it is a primary object of this invention to fulfill this need.

SUMMARY OF THE INVENTION

Accordingly, this invention proves an attachment for a reciprocating saw, the saw having a body and a drive head arranged to reciprocate in one, axial direction. This attachment comprises an offset member having mounting means whereby it may be releasably mounted on the drive head, blade attachment means arranged for attachment of a saw blade thereto, and a lateral extension member extending between the mounting means and the blade attachment means such that when the mounting means are mounted on the drive head the lateral extension member will extend laterally of said axial direction and hold the blade attachment means clear of the saw body. The attachment also comprises a guard member having an engagement member provided with a substantially planar wall engaging surface adapted to engage a wall, and a slot extending from the wall engaging surface through the engagement member, the guard member also having guard mounting means whereby it may be pivotally mounted on the body of the saw at a point spaced from the drive head thereof, such that the wall engaging surface extends transversely of said axial direction, and such that a saw blade mounted on the blade attachment means will extend through the slot.

In saying that the lateral extension member holds the blade attachment means clear of the saw body, we mean that the blade can cut in a wall immediately adjacent an interior corner without the body of the saw contacting the other wall forming the corner. In strict geometric terms, the blade attachment means should hold the blade outside the volume defined by translating the saw body forwardly parallel to the direction of movement of the drive head.

In one preferred form of the attachment of the present invention, the offset member is substantially L-shaped and comprises a first limb bearing at its one end the mounting means, and a second limb attached to the opposed end of the first limb, extending substantially normal to the first limb and bearing the blade attachment means. Preferably, both the first and second limbs of the offset member are elongate, with the first limb extending substantially along said axial direction and the second limb extending substantially normal to said axial direction.

In the present attachment, the blade attachment means preferably comprises an auxiliary member capable of being releasably secured to the remaining portion of the offset member, the auxiliary member and the remaining portion of the offset member each being provided with a bearing surface such that the auxiliary member can be secured to the remaining portion of the offset member with a saw blade clamped between the two bearing surfaces.

In another preferred form of the attachment of the present invention, in addition to the engagement member, the guard member comprises an elongate extension piece bearing at one end the guard mounting means, the opposed end of the extension piece being secured to the engagement member. Desirably, the engagement member has the form of a flat plate and the extension piece extends substantially normal to this flat plate. Also desirably, the slot in the engagement member is a closed slot completely surrounded by the wall engaging surface. Preferably, the guard member further comprises a side piece attached to the engagement member adjacent the slot therein and extending rearwardly towards the saw body, adjacent a saw blade mounted on the blade attachment means, whereby the side piece acts as a guard for the saw blade.

Conveniently, the extension piece is provided with biasing means arranged to hold the engagement member in a central position when the engagement member is not in contact with a wall. This biasing means may comprise at least two springs disposed on opposed sides of the extension piece. The guard mounting means may comprises a shaft mounted on the saw body, the extension piece being mounted on the shaft, at least one of the saw body and the extension being pivotable relative to the shaft, and the biasing means being mounted on the shaft. In such an arrangement, conveniently the extension piece comprises a pair of spaced flanges, each of which has an aperture extending therethrough, and the shaft passes through these apertures.

BRIEF DESCRIPTION OF THE DRAWINGS

A preferred embodiment of the saw attachment of the present invention will now be described, though by way of illustration only, with reference to the accompanying drawings. As used hereinafter terms such as "top plan view", "underneath plan view", "side elevation" and similar terms are used with respect to an orientation of the saw and attachment in which the toothed edge of a saw blade is facing downwardly. The present invention is of course not restricted to any specific orientation of the saw and attachment, especially since, as is well known to those skilled in the use of reciprocating saws, users often find it necessary to orient the saws with the blades horizontal, or even with the toothed edges of the blades directed upwardly.

DETAILED DESCRIPTION OF THE INVENTION

Figure 1:
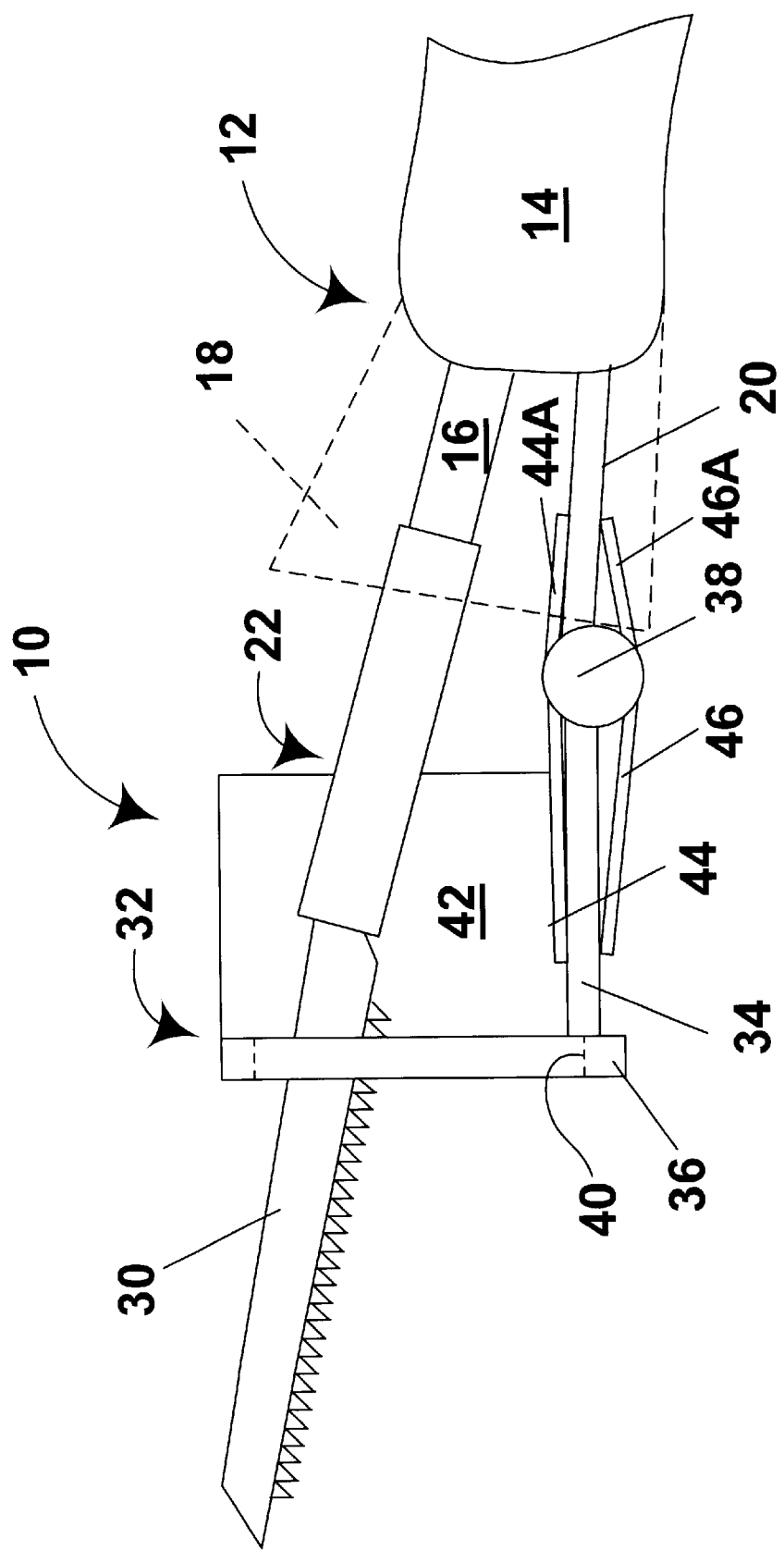
FIG. 1 of the accompanying drawings is a side elevation of a saw attachment of the present invention mounted upon a reciprocating saw, only part of which is shown in the drawings.
Figure 2:
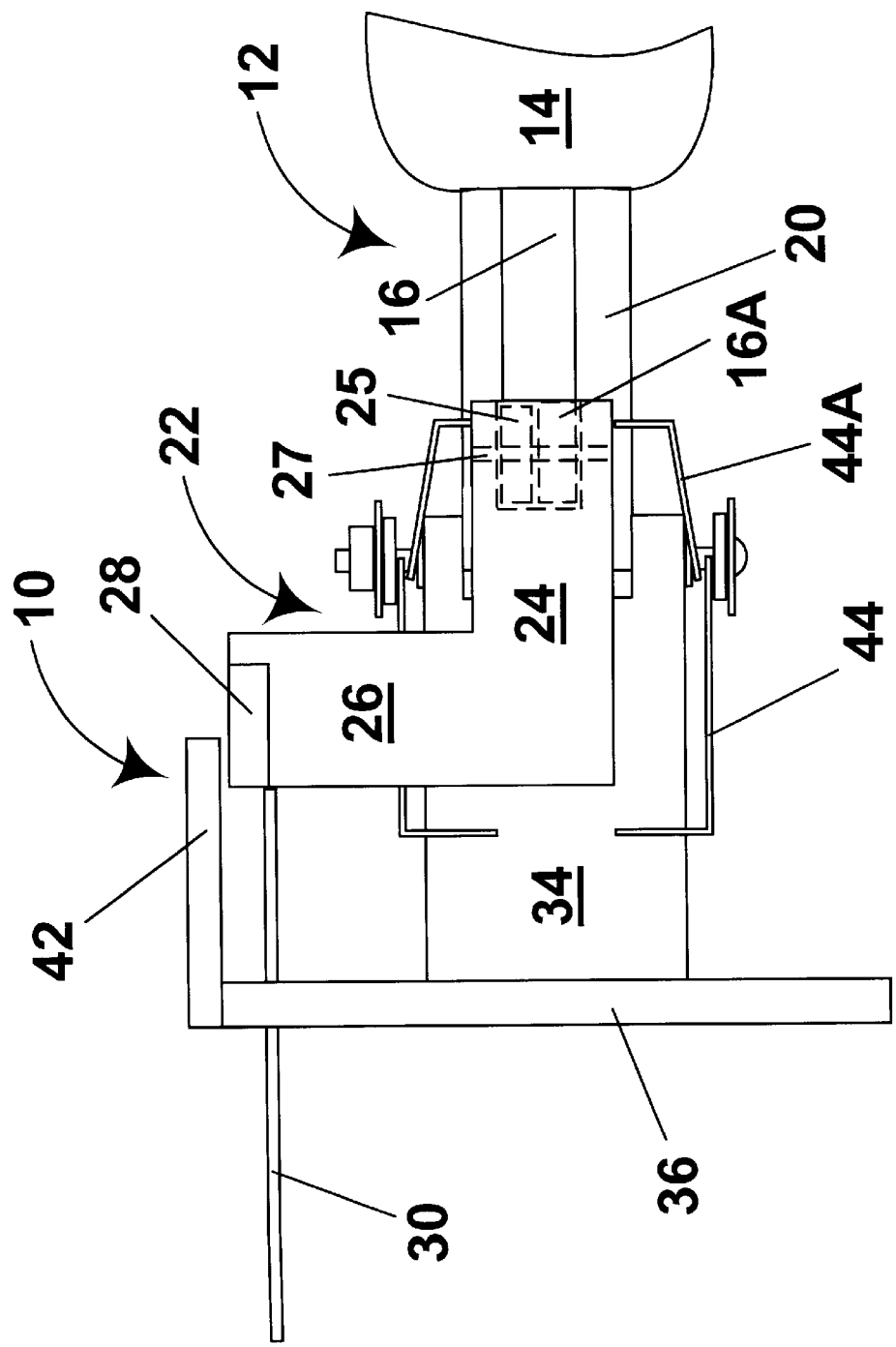
FIG. 2 is an top plan view of the saw and attachment shown in FIG. 1.
Figure 3:
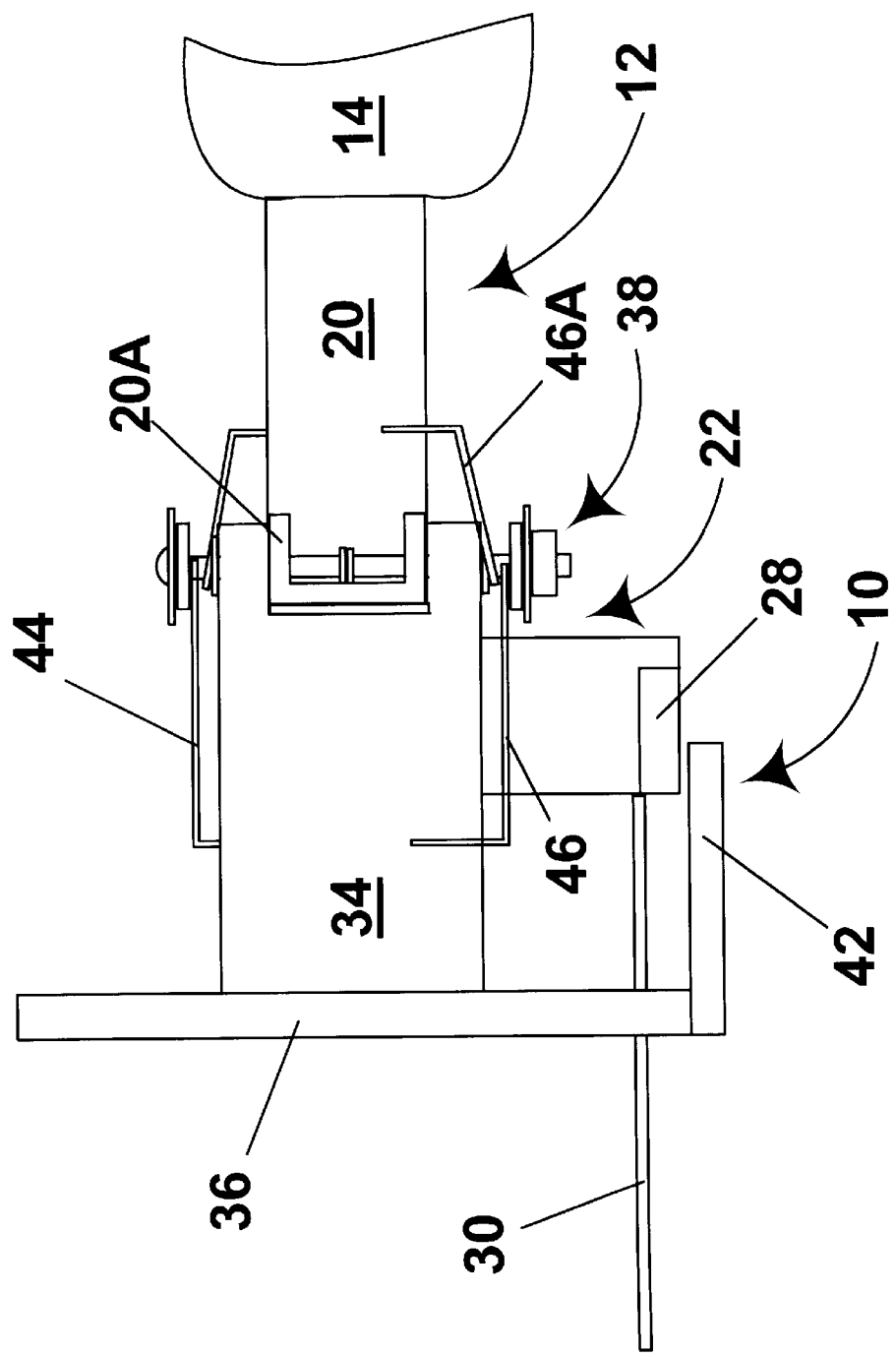
FIG. 3 is an underneath plan view of the saw and attachment shown in FIGS. 1 and 2.

FIGS. 1–3 of the accompanying drawings illustrate a preferred saw attachment (generally designated 10) of the present invention in use on a conventional electrically-powered reciprocating saw (generally designated 12), only part of which is shown in the drawings. As is conventional, the saw 12 has a substantially cylindrical body 14 at one end of which is provided a reciprocating drive head 16, which can be reciprocated substantially along the axis of the body 14, the portion of the body 14 adjacent the drive head 16 being provided with a rubber cover (not shown) to facilitate manual gripping of this portion of the saw body by an operator. The rubber cover is integral with a flexible frusto-conical skirt 18; this skirt 18 is shown in broken lines in FIG. 1 in order not to obscure details of the attachment of the present invention, and is omitted entirely from FIGS. 2, 3 and 4. The end of the drive head 16 remote from the body 14 terminates in a hemicylindrical portion 16A (see FIG. 2, where this portion is shown in broken lines) having a bore extending therethrough; when the saw is being used in the conventional manner, without the attachment 10 of the present invention, a saw blade can be clamped against the flat surface provided by the hemicylindrical portion 16A and held there by a bolt or similar attachment device passing through the bore in portion 16A. Below the drive head 16, the body 14 is provided with a projecting flange 20, on which the guard member of the attachment is supported, as described in more detail below.

The saw attachment 10 comprises an offset member (generally designated 22), the form of which is most easily seen in FIG. 2. The offset member 22 is substantially L-shaped and has a first limb 24 provided at its rear end (the end adjacent the saw 12) with a cylindrical recess into which extends the hemicylindrical portion 16A of the drive head 16. The remaining part of the cylindrical recess in the first limb 24 is occupied by a substantially hemicylindrical chip 25, having a bore extending therethrough. A screw 27 provided with an Allen head (not shown) is engaged in threaded bores provided in the first limb 24 adjacent the cylindrical recess therein, this screw 27 passing through the bores in the chip 25 and the portion 16A of the drive head 16, and thus holding the first limb 24, and thus the entire offset member 22, securely on the drive head 16 for reciprocation therewith. The forward end of the first limb 24 is integral with a second limb 26, which extends normal to the first limb and thus transversely to the axial direction of reciprocation of the drive head 16. At the outer free end of second limb 26 is disposed a cuboidal auxiliary member 28, which is releasably secured to the second limb 26 by a screw (not shown) engaged in threaded recess (also not shown) in the second limb 26; the second limb 26 also has a detent (not shown) which fits into a corresponding recess in the auxiliary member 28. The facing surfaces of the auxiliary member 28 and the second limb 26 form flat bearing surfaces, so that, as best seen in FIG. 2, a saw blade 30 can be releasably clamped between these bearing surfaces. The second limb 26 is of sufficient length that the saw blade 30 clamped between the bearing surfaces is clear of the body 14. The offset member 22 is desirably formed of aluminum (other strong, light-weight materials can of course be substituted) in order to reduce the weight of material which must be reciprocated by the drive head 16 when the saw is being used.

The saw attachment 10 also comprises a guard member (generally designated 32), which is best seen in FIG. 1 and which comprises an extension piece 34 and an engagement member 36. The rearward end of the extension piece 34 is provided with guard mounting means in the form of a pivot assembly 38 mounted on the flange 20 (the manner in which the extension piece 34, the pivot assembly 38 and the flange 20 are connected will be discussed in more detail below with reference to FIGS. 3 and 4), while the forward end of the extension piece is welded to the lower edge of the engagement member 36.

The engagement member 36 has the form of a flat rectangular plate provided with a closed slot 40 which is offset from the axis of the drive head 16 and through which the saw blade 30 projects. The flat front surface of the engagement member 36 is designed to lie flat against the wall or other surface into which the blade 30 is cutting, thus assisting the operator to make a clean, straight cut, and minimizing the risk of damage to the wall or other surface. It will be seen that this flat front surface extends on both sides of the blade 30, thus reducing any tendency for the engagement member to wobble from side to side as the saw is cutting. A side piece 42 is secured to the vertical edge of the engagement member 36 adjacent the blade 30, this side piece 42 extending rearwardly from the engagement member 36 to a point adjacent the second limb 26 of the offset member 22, so that the side piece acts as a guard to screen the rearward portion of the blade 30.

As already mentioned, the extension piece 34, and thus the engagement member 36 are pivotally mounted on the saw body 14, this pivotal mounting of the engagement member permitting the flat front surface of the engagement member to lie flat against the wall or other surface being cut despite considerable variation in the angle of the saw blade 30 relative to this surface; for this purpose, the height of the slot 40 is made considerably greater than that of the saw blade 30. Biasing means in the form of springs acting on the extension piece 34 are provided to bias the extension piece 34 and the engagement member 36 towards a central position. As best seen in FIGS. 2 and 3, the biasing means comprises two L-shaped springs 44, which act upon the upper surface of the extension piece 34, and a single L-shaped spring 46, which acts upon the lower surface of the extension piece 34. Also as best seen in FIGS. 2 and 3, the central parts of the springs 44 are wrapped around the pivot assembly 38 and the rear portions 44A of the springs 44 rest in contact with the upper surface of the flange 20. Similarly, the central part of the spring 46 is wrapped around the pivot assembly 38 and the rear portion 46A of the spring 46 rests in contact with the lower surface of the flange 20.

Figure 4:
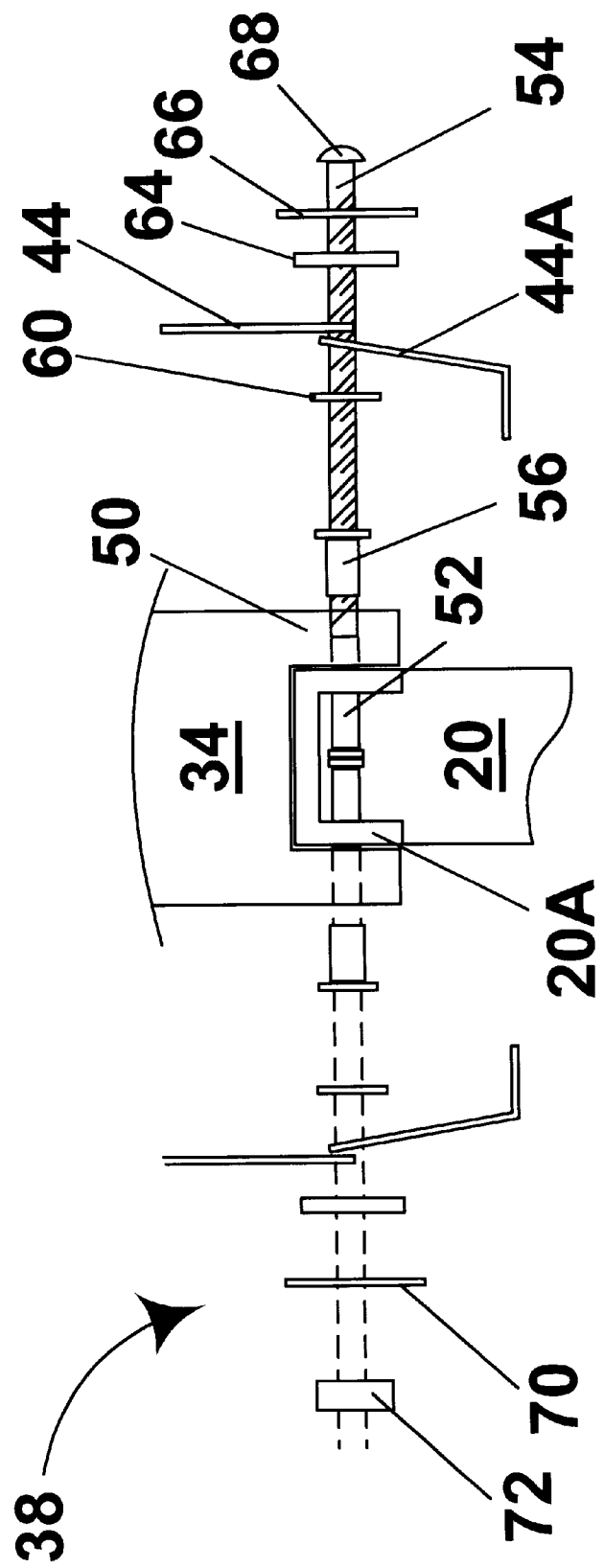
FIG. 4 is an enlarged exploded view of the shaft on which the guard member of the attachment shown in FIGS. 1, 2 and 3 is mounted, and illustrates the manner in which this guard member and its associated springs are arranged on this shaft.

The manner in which the guard member is mounted on the saw body via the pivot assembly 38 will now be described with reference to FIGS. 3 and 4. From these Figures, it will be seen that the forward end of flange 20 is provided with a substantially U-shaped flange 20A which extends downwardly from the main flange 20, The U-shaped flange 20A is provided with two aligned apertures (not shown) through which the pivot assembly 38 passes. The extension piece 34 terminates in two flanges or lugs 50 adjacent opposed edges of the extension piece 34, these flanges 50 lying immediately adjacent the side portions of the flange 20A and each having an aperture extending therethrough, the apertures in the flanges 50 being aligned with those in the flange 20A. The pivot assembly 38 comprises two plastic bushings 52 which are disposed back to back between the flanges 50, these bushings 52 having central apertures extending axially therethrough. A bolt 54 is passed through the apertures in the flanges 50 and 20A and the apertures in the bushings 52. To allow smooth pivoting of the extension piece 34 relative to the bolt 54, plastic sleeves (generally designated 56) extend around the bolt 54; each of these sleeves 56 comprises a hollow cylindrical section, which lies within the associated aperture in the flange 50, and a flat circular section, having a central aperture aligned with central aperture of the associated hollow cylindrical section, and which is held against the outer surface of the associated flange 50 by a washer 60. The central parts of the L-shaped springs 44 are wrapped around the bolt 54 immediately "outboard" of the washers 60; the central part of the spring 46 is similarly wrapped around the bolt 54, but spring 46 is omitted from FIG. 4 for ease of illustration. Knurled brass nuts 64 are engaged with the bolt 54 immediately outboard of the springs 44 and serve to apply pressure on the springs 44, the washers 60 and the sleeve 56 to hold all these integers pressed against the associated flange 50. Finally, at one end of the bolt 54 a large washer 66 is provided between the nut 64 and the head 68 of the bolt 54, while at the other end of the bolt 54 a similar large washer 70 is provided between the nut 64 and a locknut 72.

It will readily be apparent to those skilled in the art that numerous changes and modifications can be made to the preferred embodiments of the invention described above without departing from the scope of the invention. For example, the engagement member 36 could be provided with two slots adjacent the opposed vertical edges thereof, so that the offset member could be flipped to the opposite side of the saw body without having to remove and replace the guard member from its mounting. Also, numerous possible variations in the springs 44 and 46 used to spring bias the engagement member 36 will readily be apparent to skilled mechanical engineers. Therefore, it is intended that the embodiments described herein be considered as illustrative and not be construed in a limiting sense.

From the foregoing, it will be seen that the present invention provides a saw attachment which facilitates making saw cuts in surfaces adjacent an inside corner without the need to bend the saw blade, and in a manner which minimizes risk of damage to the surfaces adjacent the corner or injury to the operator.

What we claim is:

1. An attachment for a reciprocating saw, the saw having a body and a drive head arranged to reciprocate in one, axial direction, the attachment comprising:

an offset member having mounting means whereby it can be releasably mounted on the drive head, blade attachment means arranged for attachment of a saw blade thereto, and a lateral extension member extending between the mounting means and the blade attachment means such that when the mounting means are mounted on the drive head, the lateral extension member will extend laterally of said axial direction and hold the blade attachment means clear of the saw body; and a guard member having an engagement member provided with a substantially planar wall engaging surface adapted to engage a wall, and a slot extending from the wall engaging surface through the engagement member, the guard member also having guard mounting means whereby it can be pivotally mounted on the body of the saw at a point spaced from the drive head thereof, such that the wall engaging surface extends transversely of said axial direction, and such that a saw blade mounted on the blade attachment means will extend through the slot.

2. An attachment according to claim 1 wherein the offset member is substantially L-shaped and comprises a first limb bearing at its one end the mounting means, and a second limb attached to the opposed end of the first limb, extending substantially normal to the first limb and bearing the blade attachment means.

3. An attachment according to claim 2 wherein both the first and second limbs of the offset member are elongate, with the first limb extending substantially along said axial direction and the second limb extending substantially normal to said axial direction.

4. An attachment according to claim 1 wherein the blade attachment means comprises an auxiliary member capable of being releasably secured to a portion of the offset member, the auxiliary member and said portion of the offset member each being provided with a bearing surface such that the auxiliary member can be secured to said portion of the offset member with a saw blade clamped between the two bearing surfaces.

5. An attachment according to claim 1 wherein, in addition to the engagement member, the guard member comprises an elongate extension piece bearing at one end the guard mounting means, the opposed end of the extension piece being secured to the engagement member.

6. An attachment according to claim 5 wherein the engagement member has the form of a flat plate and the extension piece extends substantially normal to this flat plate.

7. An attachment according to claim 5 wherein the slot in the engagement member is a closed slot completely surrounded by the wall engaging surface.

8. An attachment according to claim 5 wherein the guard member further comprises a side piece attached to the engagement member adjacent the slot therein and extending rearwardly towards the saw body, adjacent a saw blade mounted on the blade attachment means, whereby the side piece acts as a guard for the saw blade.

9. An attachment according to claim 5 wherein the extension piece is provided with biasing means arranged to hold the engagement member in a central position when the engagement member is not in contact with a wall.

10. An attachment according to claim 9 wherein the biasing mean comprises at least two springs disposed on opposed sides of the extension piece.

11. An attachment according to claim 9 wherein the guard mounting means comprises a shaft mounted on the saw body, the extension piece being mounted on the shaft, at least one of the saw body and the extension piece being pivotable relative to the shaft, and where the biasing means are mounted on the shaft.

12. An attachment according to claim 11 wherein the extension piece comprises a pair of spaced flanges, each of which has an aperture extending therethrough, and the shaft passes through these apertures.

* * * * *